US008656294B2

(12) United States Patent
Wässingbo

(10) Patent No.: US 8,656,294 B2
(45) Date of Patent: Feb. 18, 2014

(54) USER INTERFACE FOR A TOUCH SENSITIVE DISPLAY ON AN ELECTRONIC DEVICE

(75) Inventor: Tomas Karl-Axel Wässingbo, Malmö (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 156 days.

(21) Appl. No.: 13/104,392

(22) Filed: May 10, 2011

(65) Prior Publication Data

US 2011/0289406 A1    Nov. 24, 2011

(30) Foreign Application Priority Data

May 25, 2010    (WO) .................. PCT/IB2010/001232

(51) Int. Cl.
*G06F 3/01* (2006.01)
(52) U.S. Cl.
USPC ............ 715/769; 715/256; 715/773; 715/702
(58) Field of Classification Search
USPC ......................................... 715/256, 769, 773
See application file for complete search history.

(56) References Cited

U.S. PATENT DOCUMENTS

| | | | | |
|---|---|---|---|---|
| 6,309,305 | B1 * | 10/2001 | Kraft ............................. | 455/566 |
| 8,289,283 | B2 * | 10/2012 | Kida et al. .................... | 345/173 |
| 2004/0160419 | A1 * | 8/2004 | Padgitt .......................... | 345/173 |
| 2004/0261038 | A1 * | 12/2004 | Ording et al. ................. | 715/792 |
| 2005/0231514 | A1 * | 10/2005 | Harper et al. ................. | 345/501 |
| 2006/0033724 | A1 * | 2/2006 | Chaudhri et al. ............. | 345/173 |
| 2007/0136433 | A1 * | 6/2007 | Booton et al. ................ | 709/213 |
| 2009/0228792 | A1 | 9/2009 | van Os et al. | |
| 2009/0315852 | A1 * | 12/2009 | Kocienda et al. ............ | 345/173 |
| 2010/0123724 | A1 * | 5/2010 | Moore et al. .................. | 345/473 |
| 2012/0210266 | A1 * | 8/2012 | Jiang et al. .................... | 715/772 |

FOREIGN PATENT DOCUMENTS

GB    2425700    11/2006

OTHER PUBLICATIONS

International Search Report in re Int'l App No. PCT/IB2010/001232 mailed Feb. 11, 2011.

* cited by examiner

*Primary Examiner* — Cesar Paula
*Assistant Examiner* — Mohammed-Ibrahim Zuberi
(74) *Attorney, Agent, or Firm* — Coats & Bennett, P.L.L.C.

(57) ABSTRACT

A user interface (UI) for a text editing application executing on an electronic device, such as a wireless communication device, partitions a touch-sensitive display into two functional areas, a user input area and a text composition area. The UI displays text output in the text composition area and allows a user to scroll "user documents" through the input area. From an active user document displayed in the input area, users can automatically copy-and-paste text directly into a text area without having to exit the text editing application.

16 Claims, 8 Drawing Sheets

USER INTERFACE FOR A TOUCH SENSITIVE DISPLAY ON AN ELECTRONIC DEVICE

RELATED APPLICATIONS

This application claims priority from PCT application PCT/IB2010/001232, which is entitled, "A User Interface for a Touch Sensitive Display on an Electronic Device." That application was filed on May 25, 2010 and is incorporated herein by reference in its entirety.

FIELD OF THE INVENTION

This application relates generally to electronic devices, and particularly to user interfaces on electronic devices capable of executing a text editing applications.

BACKGROUND

An increasing number of manufacturers are now providing electronic devices having touch sensitive display screens. One type of electronic device that includes a touch sensitive display is the SMARTPHONE. With a SMARTPHONE, the entire front face of the device generally comprises a touch sensitive display. The relatively large size of the display provides a large output area that allows users to view video, images, and other output more comfortably than on devices having the smaller, conventional Liquid Crystal Displays (LCDs). Additionally, it also provides users with a larger input area to facilitate the input interfaces associated with user applications such as text editing applications.

Many SMARTPHONES are able to execute text editing applications, such as text messaging applications, that, when executed, divide the touch sensitive displays into two functional areas—an input area and an output area. The output area is for displaying text. The input area is for displaying user input interfaces such as a QWERTY keypad. As is known in the art, the user can compose text, such as text messages, by touching desired characters on the keypad with a finger. With each touch of a key, the device is pre-programmed to display a corresponding character in the output area.

In addition to text, there are some very popular software programs available that allow users to insert graphics into text-based documents such as text messages. One such application, developed for APPLE'S iPHONE by a company called AWESOMEST SOFTWARE, is entitled "EMOJI FREE!" (http://itunes.apple.com/app/emoji-free/id332509635?mt=8). With this application, users creating text messages, for example, can choose to display either the QWERTY keypad to input text, or one of a plurality of other available keypads that display predetermined graphical symbols (e.g., smiley faces, symbols, emoticons). Like the QWERTY keypad, the user simply touches a desired graphical symbol on the displayed graphical keypad. With each touch of a key, the corresponding graphical character (e.g., a smiley face) is pre-programmed to appear in the output area.

Although useful, there are still areas for improvement. For example, while composing text, it is relatively easy for a user to touch an incorrect letter on the QWERTY keypad thereby making it difficult to spell words correctly. Additionally, users will often want to incorporate words, phrases, and other text contained in one or more separate documents without first having to exit the text editing application to copy and paste the desired text.

SUMMARY

The present invention provides a user interface (UI) for a text editing application executing on an electronic device, such as a wireless communication device. With the UI of the present invention, a user can scroll a plurality of documents that contain text through the input area of a touch sensitive display until the user locates a desired document. The user can then copy text contained in that document, and paste that text into a text message or other text document being composed by the user. The UI is particularly useful in devices having a touch-sensitive display screen that receives user input.

In one embodiment, the present invention provides an electronic device comprising a touch sensitive display and a processor configured to execute a text editing application. In this embodiment, the processor displays a user interface for the text editing application. The user interface includes a user input area to receive user input and a text composition area to display text output. The processor is further configured to display a user input interface in the input area, replace the a user input interface displayed in the input area with a user document that includes text responsive to a user command, and copy and paste user-selected text from the user document displayed in the input area into the text composition area.

In one embodiment, the user input interface displayed in the input area comprises a touch-sensitive keypad.

In one embodiment, the processor is further configured to scroll a plurality of user documents through the input area responsive to receiving one or more user commands. The processor may be configured to scroll the plurality of user documents forwards and backwards through the input area responsive to respective first and second user commands.

In one embodiment, the user document comprises a web page.

In one embodiment, the processor is configured to automatically copy and paste the user-selected text from the user document displayed in the input area into the text composition area responsive to detecting a touch and release action performed by the user.

In one embodiment, the processor is configured to automatically copy the user-selected text from the user document displayed in the input area into memory responsive to the user touching the user-selected text.

In one embodiment, the user-selected text comprises a plurality of consecutive words contained in the user document that have been selected responsive to a drag action performed by the user.

In another embodiment, the processor is configured to automatically paste the user-selected text from the memory into the text composition area responsive to the user releasing the user-selected text.

In one embodiment, the processor is configured to partition the touch sensitive display into the input area and the text composition area.

In another embodiment, the present invention provides a method of editing text on an electronic device. The method may comprise displaying a user interface for a text editing application executing on the electronic device to include a user input area to receive user input and a text composition area to display text output, displaying a user input interface in the input area, replacing the user input interface displayed in the input area with a user document that includes text, and copying and pasting user-selected text from the user document displayed in the input area into the text composition area.

In one embodiment, replacing the user input interface displayed in the input area with the user document comprises replacing a touch-sensitive keypad displayed in the input area with the user document responsive to receiving a user command.

In one embodiment, the method further comprises scrolling a plurality of user documents through the input area responsive to receiving one or more user commands. Scrolling a plurality of user documents through the input area comprises scrolling the plurality of user documents forwards and backwards through the input area responsive to respective first and second user commands.

In one embodiment, copying and pasting the user-selected text from the user document into the text composition area comprises automatically copying and pasting the user-selected text from the user document into the text composition area responsive to detecting a touch and release action performed by the user.

In one embodiment, automatically copying and pasting the user-selected text comprises automatically copying the user-selected text from the user document into memory responsive to the user touching the user-selected text.

In another embodiment, automatically copying and pasting the user-selected text comprises automatically copying a plurality of user-selected words from the user document responsive to detecting a drag action performed by the user.

In one embodiment, automatically copying and pasting the user-selected text comprises automatically pasting the user-selected text from the memory into the text composition area responsive to the user releasing the user-selected text.

In one embodiment, the method also comprises partitioning the touch sensitive display into the input area and the messaging composition area.

Of course, those skilled in the art will appreciate that the present invention is not limited to the above contexts or examples, and will recognize additional features and advantages upon reading the following detailed description and upon viewing the accompanying drawings.

DETAILED DESCRIPTION

Figure 1:
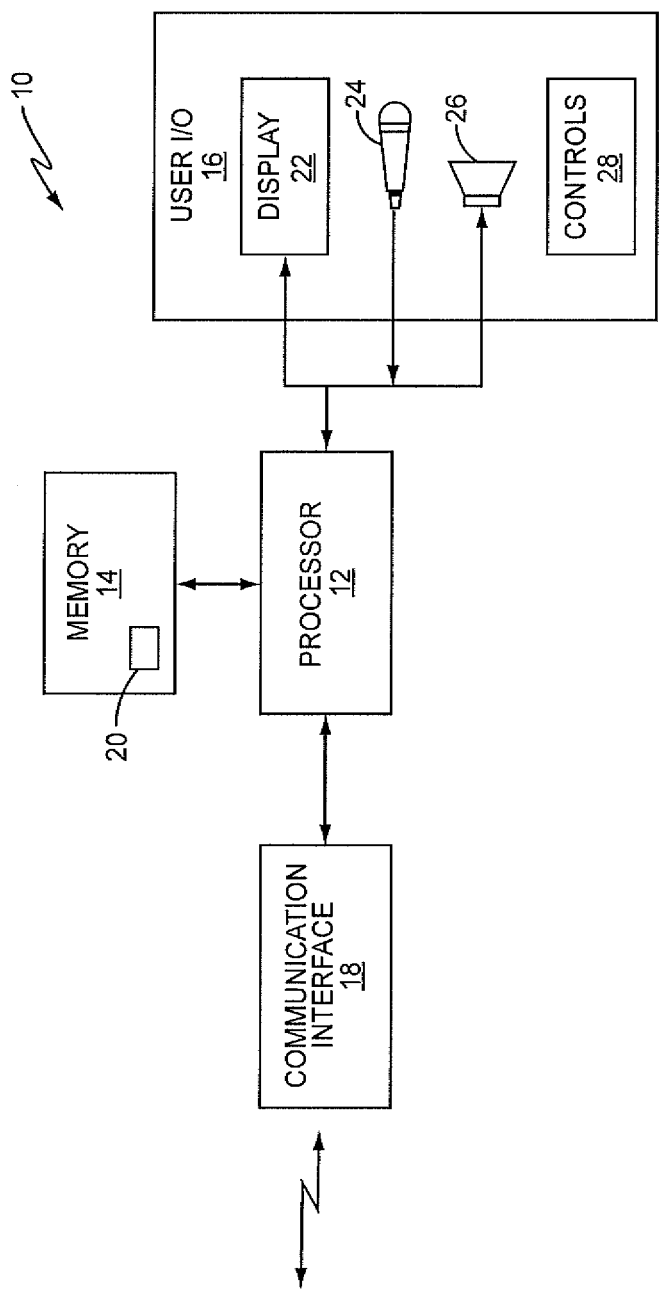
FIG. 1 is a block diagram illustrating some of the components of a wireless communication device configured according to one embodiment of the present invention.

The present invention provides a user interface (UI) for a text editing application executing on an electronic device. The text editing application allows a user to compose text-based documents, such as word processing documents, spreadsheets, and text messages, for example. However, with the present invention, the user is able to copy and paste selected text from other documents into the document being composed without first having to leave the text editing application to obtain the desired text. Particularly, the user is able to scroll through a plurality of "user documents" on the UI of the wireless communication device without first having to leave the text editing application. Once the user has located a desired document, the user can perform an action that will cause the device to automatically copy-and-paste selected text from that user-document into the text being composed by the user.

As defined herein, a "user document" is an electronic document containing arbitrary text. That is, the document contains text that has been arbitrarily composed or generated. Some examples of "user documents" include, but are not limited to, word processing documents, spreadsheets, web pages, text messages, and lists of commonly used or recently used words and/or phrases. In some cases, user documents may also include graphics, hyperlinks, and embedded files in addition to the arbitrary text.

An advantage of the present invention is that the user need not exit the text editing application in order to copy-and-paste words from another document into the a current document containing text. To accomplish this, the present invention partitions a touch sensitive display on the electronic device into two functional sections. One of the sections is a touch-sensitive user input area that receives user input. With this section, the user can enter alphanumeric characters to compose text documents, such as text messages to send to one or more remote parties, for example. The other of the sections is a text composition area that displays the text being composed to the user.

Generally, the user input area displays a touch sensitive QWERTY keypad that receives the user's text input; however, other touch-sensitive user input interfaces may also be displayed in the user input area. According to the present invention, the user can selectively replace the QWERTY keypad or other input interface currently displayed in the user input area with a selected user document that contains text. From the displayed user document, the user can control the UI to automatically copy-and-paste selected text from the user document directly into text being composed using simple user, touch-based actions.

More particularly, the copy-and-paste function of the present invention does not require a user to enter multiple, independent commands to select text, copy the text, and then paste the text into the text composition area, as do conventional copy-and-paste methods. Rather, the present invention automatically copies the selected text responsive to a "touch-and-release" action performed by a user. Particularly, whenever a user "touches" text in a user document with a finger, for example, a processor in the wireless device automatically copies the text being touched into memory. When the user "releases" the text, (i.e., when the user moves the finger away from contact with the touch-sensitive display), the processor automatically pastes the selected text into the text being composed by the user. A similar "drag and release" user action causes the device to automatically copy and paste a plurality of words such as a phrase from the user document into the text being composed. Thus, the present invention negates the need for a user to perform multiple separate actions simply to copy-and-paste text. This simplifies the coding required to provide copy-and-paste operations.

Turning now to the figures, FIG. 1 is a block diagram illustrating some of the components of an electronic device 10 configured according to one embodiment of the present invention. As seen in the figures and as described in the specification, device 10 comprises a SMARTPHONE type cellular wireless communication device. Given their limited display size, such devices would especially benefit from the present invention because it would make the user more efficient at using the device. However, those skilled in the art should appreciate that the depiction of a SMARTPHONE type device is for ease of discussion and illustrative purposes only, and that device 10 may be any of a wide array of electronic devices so long as it utilizes a touch-sensitive display to receive user input and to display user output.

The text application executing on the cellular wireless communication device is described in several embodiments as being a text messaging application that allows a user to create and send text messages to a remote party. However, those skilled in the art should appreciate that this is for illustrative purposes only. As seen in more detail later, the text editing application may be a word processing application, a spreadsheet application, a browser application, or any end-user application that allows a user to enter arbitrary alphanumeric text into a document or text field displayed in the output area.

Device 10 comprises a programmable processor 12, a memory 14, a user input/output interface 16, and a communications interface 18. Processor 12 generally controls the overall operation of device 10 according to programs and instructions stored in memory 14. The processor 12, which may be implemented in hardware, firmware, software, or a combination thereof, may comprise a single microprocessor or multiple microprocessors. The microprocessors may be general purpose microprocessors, digital signal processors, or other special purpose processors. As described in more detail later, the processor 12 is programmed to scroll one or more user-documents through the input area of the touch-sensitive display and to perform the copy-and-paste function of the present invention.

Memory 14 comprises a computer-readable medium that may include both random access memory (RAM) and read-only memory (ROM). Although not specifically shown, those skilled in the art will appreciate that the memory 14 may also be embodied other hardware components, such as compact disks (CDs), hard drives, tapes, and digital video disks (DVDs) that may be connected to the device 10 via an interface port (not shown). Computer program instructions and data required for operation are stored in non-volatile memory, such as EPROM, EEPROM, and/or flash memory, which may be implemented as discrete devices, stacked devices, or integrated with the processor 12. One such computer program is the text messaging application 20. The text messaging application 20 contains computer program instructions that, when executed by processor 12, controls the processor 12 to partition a touch-sensitive display on the device 10 into the two functional sections, and to scroll one or more user documents through the input area one at a time. While displaying a user document selected by the user, the text messaging application 20 can control the processor 12 to perform the automatic copy-and-paste function.

The User Interface (UI) 16 includes one or more user input/output devices, such as a touch-sensitive display 22, a microphone 24, a speaker 26, and one or more global controls 28 to enable the user to interact with and control device 10. In one embodiment of the present invention, the processor 12 partitions the touch-sensitive display 22 into two touch-sensitive functional areas—the user input area and the text composition output area. The user input area is configured to display user documents associated with any of a plurality of application programs and to receive user input. The text composition area is generally configured to display text output, such as text messages being generated by the user. In some embodiments, the text composition area may receive touch input.

The communication interface 18 allows the device 10 to communicate messages and other data with one or more remote parties and/or devices. In this embodiment, the communication interface 18 comprises a fully functional cellular radio transceiver that can operate according to any known standard, including the standards known generally as the Global System for Mobile Communications (GSM), the General Packet Radio Service (GPRS), cdma2000, Universal Mobile Telecommunications System (UMTS), Wideband Code Division Multiple Access (WCDMA), 3GPP Long Term Evolution (LTE), and Worldwide Interoperability for Microwave Access (WiMAX). In other embodiments, however, the communication interface 18 may comprise a hardware port, such as an Ethernet port, for example, that connects device 10 to a packet data communications network. In yet another embodiment, the communication interface 18 may comprise a wireless LAN (802.11x) interface.

Figure 2:
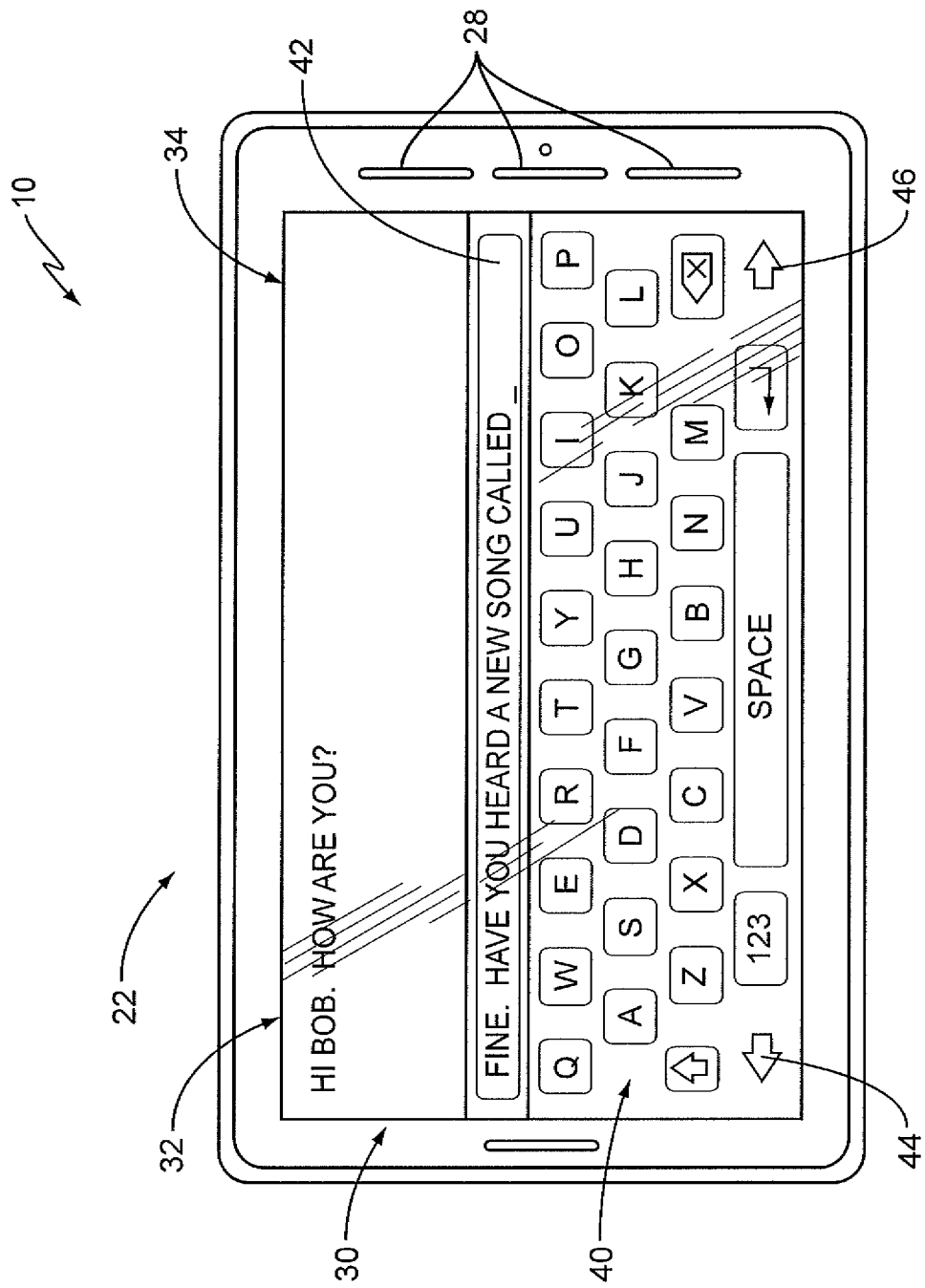
FIG. 2 is a perspective view of a SMARTPHONE configured to execute a text messaging application according to one embodiment of the present invention.
Figure 3:
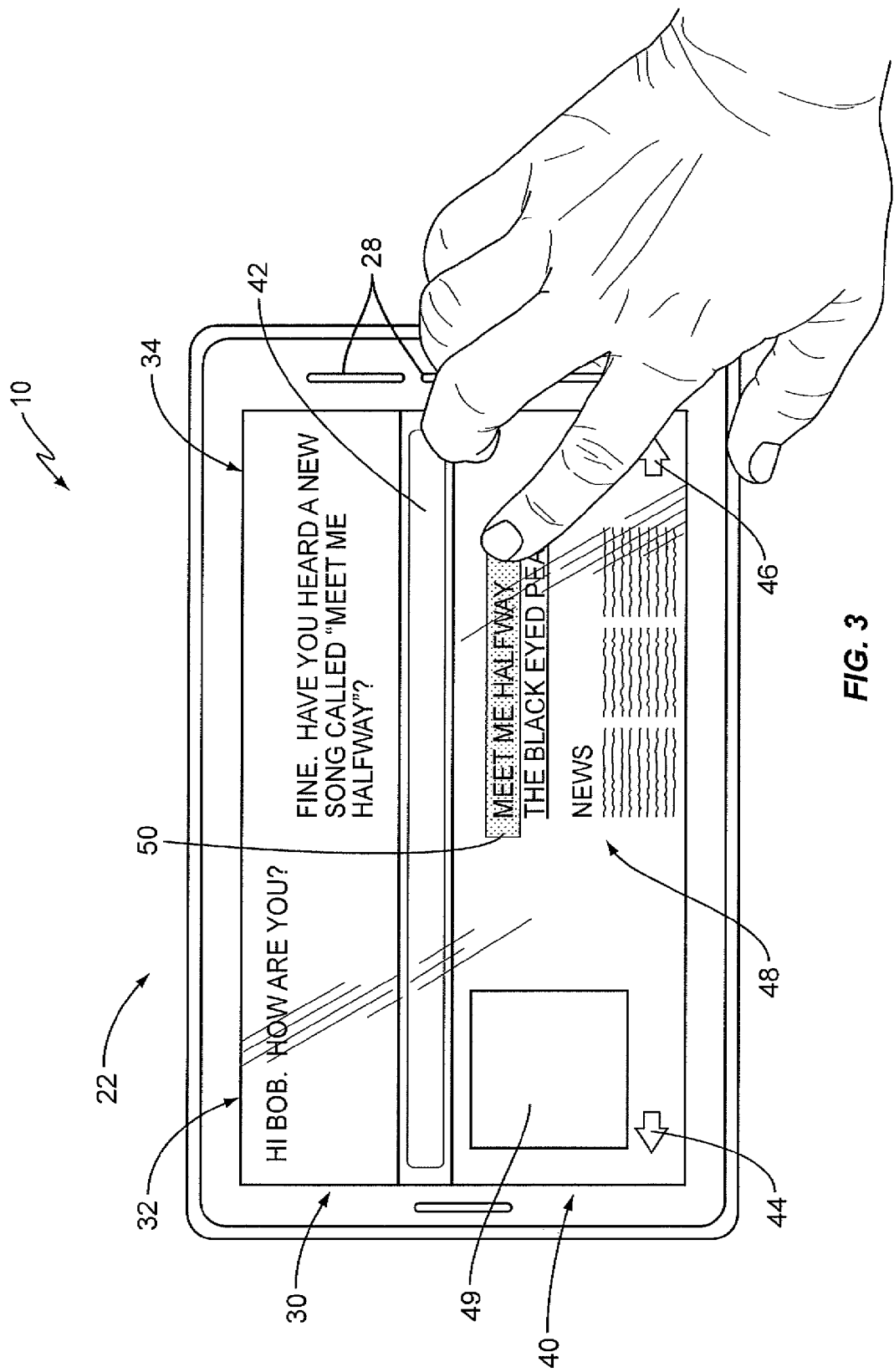
FIG. 3 is a perspective view of the SMARTPHONE seen in FIG. 2 in which the QWERTY keypad is replaced with a user document according to one embodiment of the present invention.

FIGS. 2 and 3 are perspective views of a device 10 illustrated as it might appear to a user while performing functions according to one embodiment of the present invention. As seen in these figures, device 10 is in a landscape orientation; however, those skilled in the art will appreciate that this is for illustrative purposes only, and that the present invention also functions as described when device 10 is in a portrait orientation. Typically, operating system software associated with the device 10 will detect the orientation as either landscape or portrait, and configure the areas of touch-sensitive display 22 appropriately.

In this embodiment, the touch-sensitive display screen 22 is partitioned into the text composition area 30 and the user input area 40. In this case, the partitioning generally divides the display 22 horizontally into upper and lower sections that are substantially equal in size; however, other partitioning schemes may be applied as needed or desired. The text composition area 30 is further divided vertically into two sides 32, 34. The first side 32 displays text messages received from remote parties. The second side 34 displays text messages generated by the user.

The input area 40 displays a QWERTY touch-sensitive keypad, which may be associated with text message application 20, and includes a text entry area 42 and a pair of navigation controls 44, 46. As is conventional, the user creates text message to send to the remote party by touching the individual alphanumeric characters displayed on the QWERTY keypad. Each alphanumeric character selected by the user first appears in a text entry area 42 as the user touches that character. Additionally, however, the text entry area 42 will also display graphics selected by the user, as well as text that has been copied-and-pasted from a user document according to the present invention. Typically, the text entry area 42 displays the user input until the user hits a "SEND" control (not shown) on device 10 to transmit the text message to the remote party. When that occurs, the text entry area 42 is cleared of the user-provided text and the generated text message is displayed in the text composition area 30.

As previously stated, the processor 12 is configured to "scroll" one or more user documents through the user input area 40 one at a time. To accomplish this, the processor 12 relies on signals generated by the pair of navigation controls 44, 46. In this embodiment, the controls 44, 46 are softkeys that act independently of a user interface that may be displayed in the user input area 40, and thus, remain on top of the currently displayed user interface. When the user touches one of the navigation controls 44, 46, device 10 replaces whatever user interface or user document is currently being displayed in the user input area 40 with a different user interface or user document. Touching control 44 "scrolls" the user documents from left-to-right (or right-to-left), while touching control 46 "scrolls" the user documents in the opposite direction from right-to-left (or left-to-right). Thus, the user can scroll "forward" and "backward" through the one or more user documents.

For example, as seen in FIG. 2, the user is entering text via the QWERTY keypad to generate a text message to send to a remote party. As the user touches a key in the QWERTY keypad, the corresponding letter appears in the text entry area 42. However, the user may want to copy a word or phrase from a user document containing that text directly into the text message without having to type the word or phrase itself. Therefore, the user may touch one of the controls 44, 46 to replace the QWERTY keypad with the user document that contains the desired text. Particularly, touching control 44 or 46 causes the processor 12 to generate a control signal that replaces the QWERTY keypad interface (FIG. 2) with a browser application displaying a web page previously viewed by the user (FIG. 3).

Note that the processor 12 does not terminate the software process or application associated with the QWERTY keypad or any of the user documents as they are replaced by other user documents. Rather, in one embodiment, the processor 12 may generate one or more signals as needed to place the applications associated with the documents in an inactive state. The user documents remain in this inactive state until they are displayed in the user input area 40. Upon being displayed in the user input area 40, the application associated with the currently displayed user document may be returned to an active state.

Once displayed, the user can perform a copy-and-paste function according to the present invention to copy text from the active user document directly into the text entry area 42 of the user input area 40. The user may copy-and-paste a single word, or group of words, using the same "touch and release" action provided by the present invention. For example, the active user document in FIG. 3 is a web page that includes text 48 and graphics 49. If the user wanted to copy the word "NEWS" that appears in the text 48, the user would simply touch the word "NEWS" with a finger. When the user "releases" the word "NEWS" (i.e., lifts the finger away from contact with the display 22), the word "NEWS" is placed into the text entry area 42.

A similar "drag and release" action is provided to allow the user to copy a phrase or a group of words. For example, as seen in FIG. 3, the user places a finger into contact with the display 22 proximate the first word in the desired phrase 50 (i.e., "MEET"). Then, while maintaining contact with the display 22, the user drags the finger along the desired phrase 50 until the user reaches the last word in the phrase 50 (i.e., "HALFWAY"). Then, the user "releases" the phrase 50 by lifting the finger away from contact with the display 22. Upon detecting this "release" action, processor 12 pastes the user-selected phrase 50 (i.e., "MEET ME HALFWAY") into the text entry area 42. Similarly, the user may perform the same "touch-and-release" action to effect a copy-and-paste function of other objects, such as images and videos, and other graphical objects 49 contained in the active user document.

Figure 4:
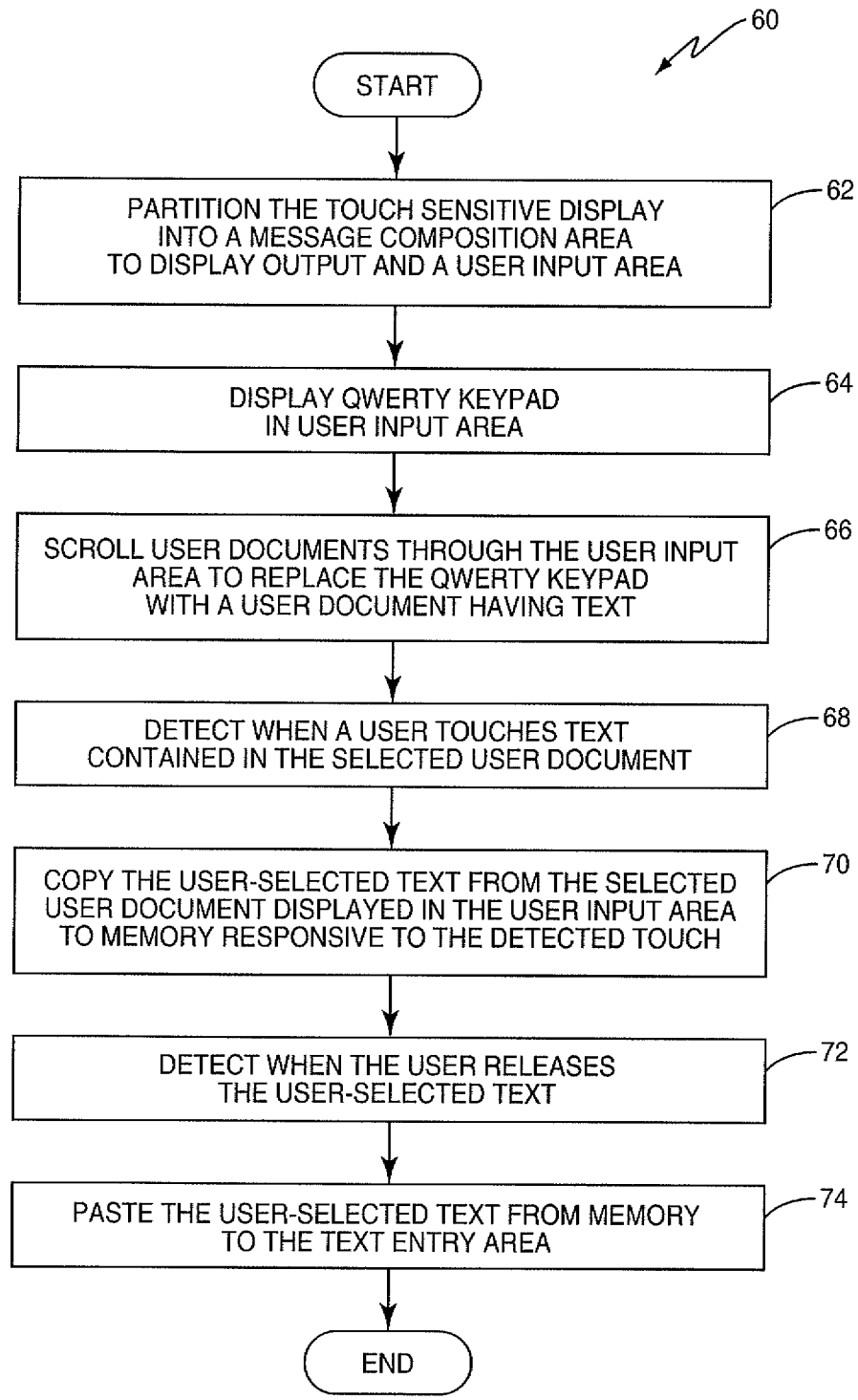
FIG. 4 is a flow chart illustrating a method of performing one embodiment of the present invention.

FIG. 4 illustrates a method 60 of performing a copy-and-paste function according to one embodiment of the present invention. Method 60 begins when the processor 12 partitions the touch sensitive display 22 on device 10 into the message composition area 30 and the user input area 40 (box 62). Once partitioned, the processor 12 displays the QWERTY keypad associated with the text messaging application 20 in the user input area 30 (box 64). The user may use the QWERTY keypad to build a text message, for example, or touch one of the navigation controls 44, 46 to replace the QWERTY keypad interface with another user document, such as a web page associated with a browser application executing on device 10. As previously described, the user may scroll one or more user documents through the user input area 30 using the navigation controls 44, 46 (box 66).

Upon reaching a selected user document, the processor 12 detects when the user touches text within active user document (box 68). Detection may be performed in any manner known in the art; however, in one embodiment, the touch-sensitive display 22 generates a signal to processor 12 whenever the user touches the touch-sensitive display 22. The processor 12 may interpret this signal as a software-based "touch event," and then execute the appropriate code to automatically copy the text to memory (box 70). Upon detecting when the user releases the text, which the processor 12 may detect as a software-based "touch release event" (box 72), the processor 12 will execute code to automatically paste the user-selected text from memory 16 into the text entry area 42 (box 74).

Thus, the present invention performs a copy-and-paste operation on text without requiring the user to explicitly enter multiple, individual commands or perform independent actions to select, copy, and paste the text from the active user-selected user document to the text entry area 46.

The present invention may, of course, be carried out in other ways than those specifically set forth herein without departing from the essential characteristics of the invention. For example, individual character selection using the QWERTY keypad can become tedious for a user, especially for lengthy or numerous text messages. The touch-sensitive display 22 is size limited, thus, the individual character keys are set close together. Because they are so close, there is a high likelihood that a user could unintentionally touch a key that is proximate a desired key thereby increasing the chance that the user will incorrectly spell a word or phrase. Therefore, a user would find it beneficial to easily select words and/or phrases for inclusion into the text message, especially if the user uses those words and phrases often.

Figure 5:
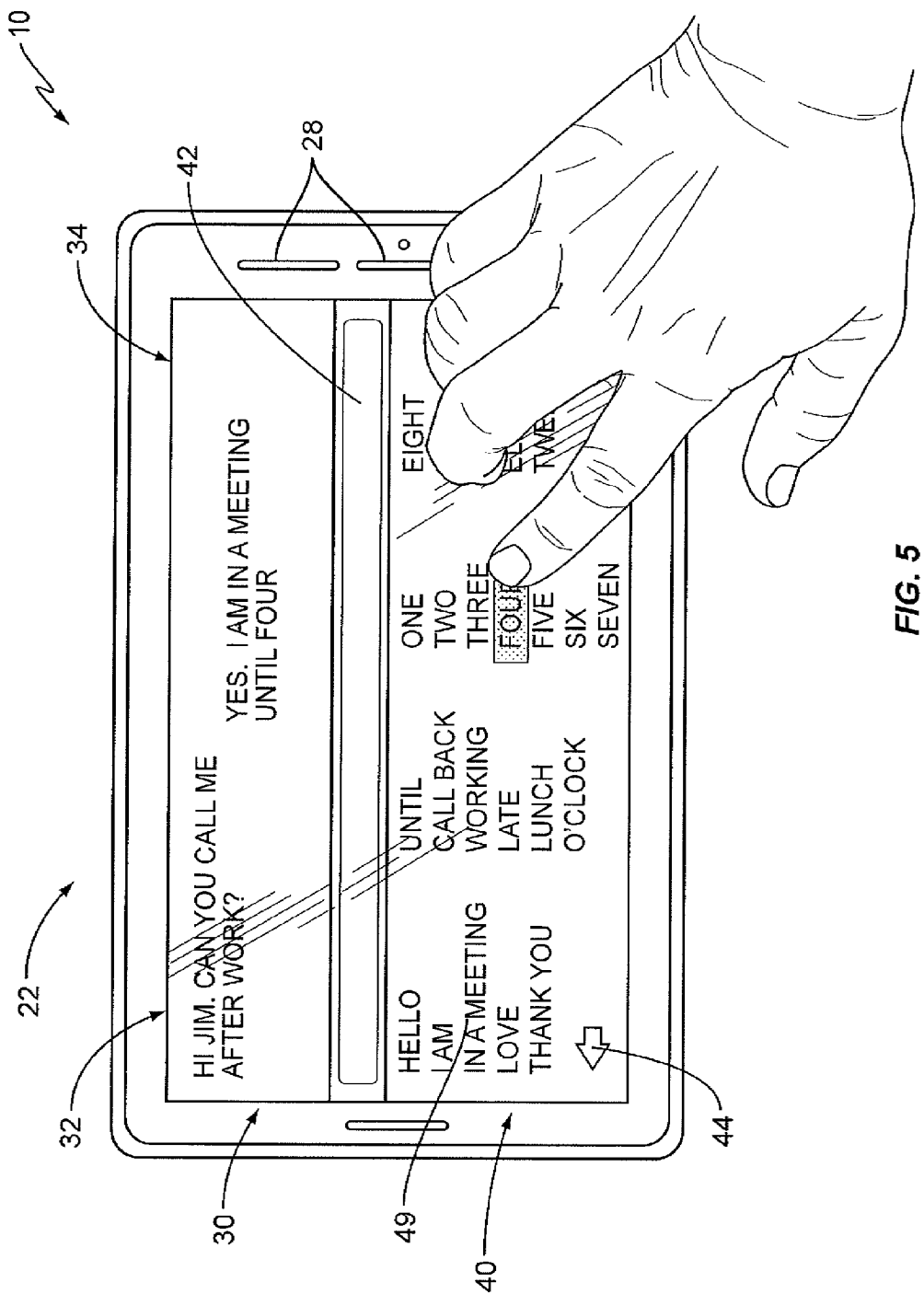
FIG. 5 is a perspective view of the SMARTPHONE a currently active user document displayed in the user input area is replaced with another user document according to one embodiment of the present invention.

In one embodiment, seen in FIG. 5, the user may scroll user documents through the input area 30 until the user arrives at a list of commonly used or recently used words. Using the previously described "touch and release" action on the words and or phrases in the list, the user can form all or part of a text message to send to the remote party. Particularly, the user simply touches a desired word or phrase with a finger. Upon detecting this contact, the processor 12 automatically copies the word or phrase to memory 14. Then, to paste the copied word or phrase to the text entry area 42, the user merely lifts the finger away from contact with the touch-sensitive display 22. Upon detecting that the user has "released" the selected word or phrase, the processor 12 automatically pastes the copied word or phrase from the memory 14 to the text entry area 42.

The text messaging application 20, or some other application executing on the device 10, may build the list of words and phrases over time by monitoring the words and phrases most often used by the user in text messages. This list may be updated over time, or edited by a user, as needed or desired.

Figure 6:
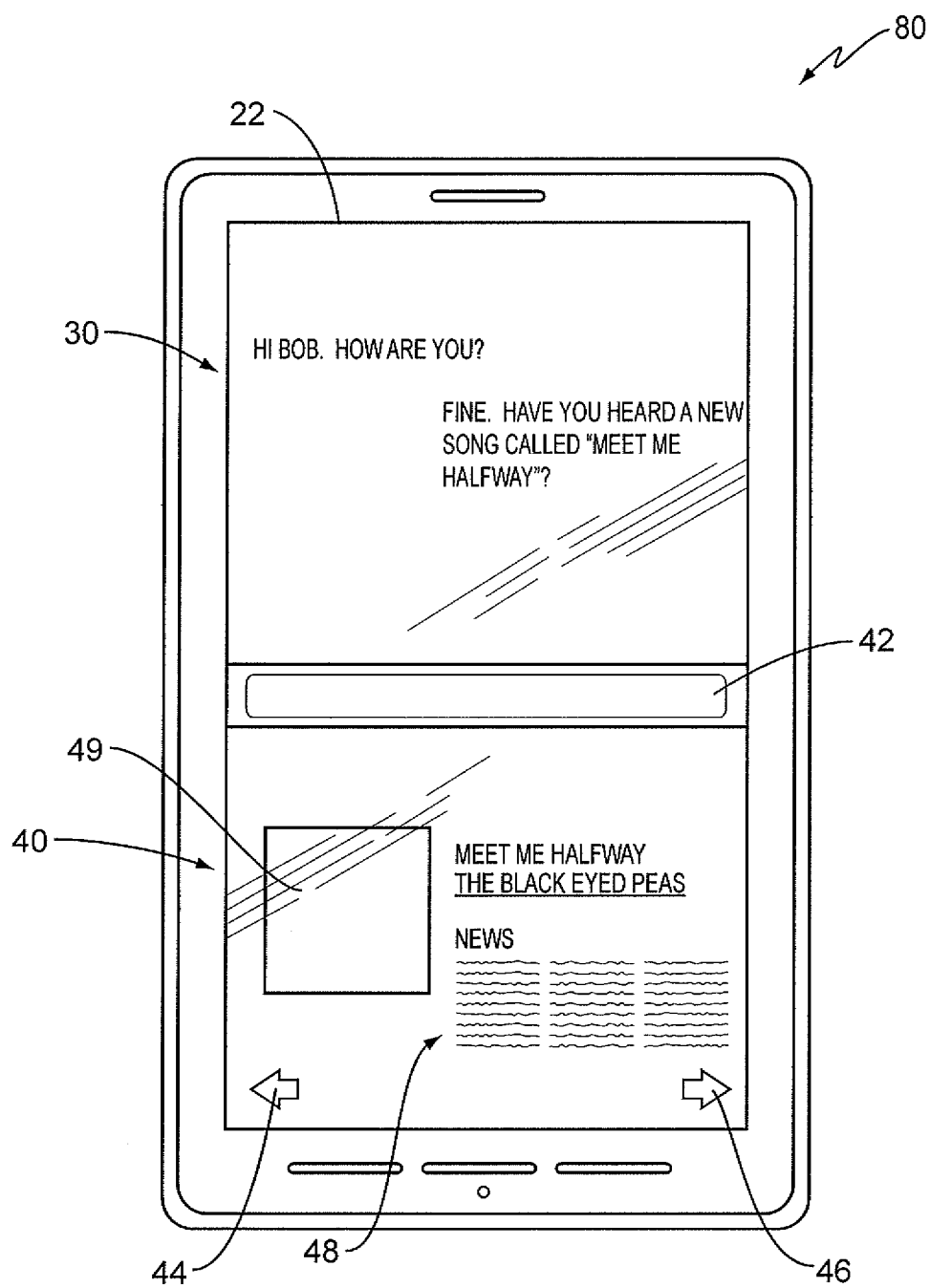
FIG. 6 is a perspective view of a tablet computing device configured according to one embodiment of the present invention.

The previous embodiments described the present invention in the context of a SMARTPHONE type wireless communications device. However, the present invention is not so limited. The copy-and-paste functionality of the present invention may be implemented on any device having a touch-sensitive display screen that receives input from a user. For example, FIG. 6 illustrates another embodiment wherein a tablet computing device 80, such as APPLE'S iPAD, for example, is configured to operate as previously described.

Additionally, those skilled in the art will readily appreciate that performing a copy-and-paste function responsive to a user's "touch and release" is also illustrative. In another embodiment, the processor 12 is configured to perform a "cut-and-paste" operation responsive to detecting the user's "touch and release" and/or "drag and release" actions. In such embodiments, the processor 12 could delete the user-selected text from the active user document once it was copied to memory 16 so long as the appropriate permissions allowed for the deletion.

Figure 7:
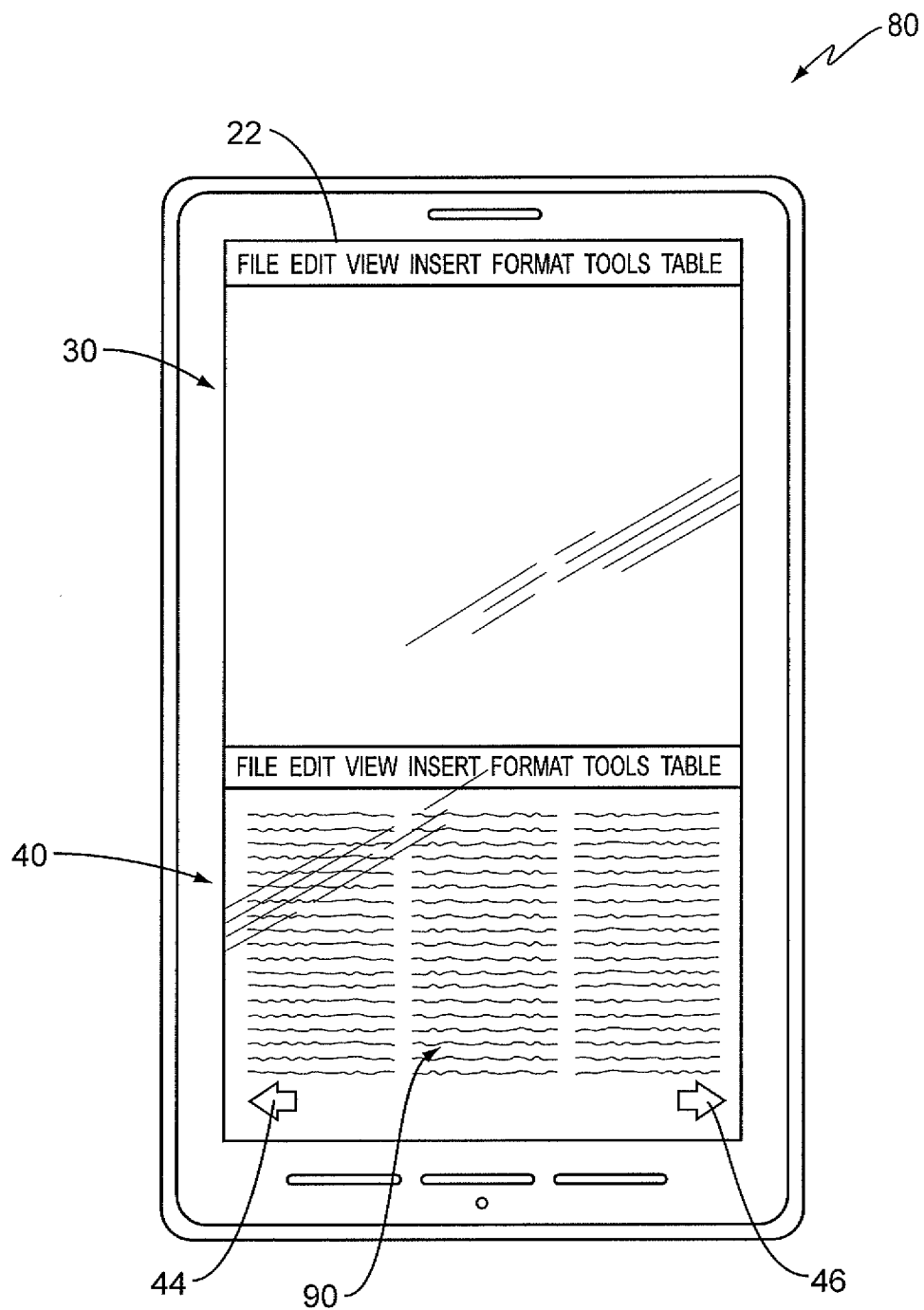
FIG. 7 is a perspective view of a tablet computing device configured to copy and paste text from a first type of user document into a composition area according to one embodiment of the present invention.

Those skilled in the art will also readily appreciate that the present invention is not limited to use with text messaging applications, as described above, but rather, may be used with other text editing applications. FIG. 7, for example, illustrates tablet computing device 80 executing a word processing application such as MICROSOFT WORD. Text entered by the user via the QWERTY keypad in input area 40 appears in the text composition area 30, as previously described. If the user wishes to copy and paste text from a user document, such another word processing document 90, for example, the user touches the navigation controls 44, 46 to scroll one or more user documents forwards and/or backwards through the input area 40 until the user arrives at the desired user document. The user then performs a touch and release action and/or a drag and release action to copy and past selected text from the active user document into the document being composed in the text composition area.

Figure 8:
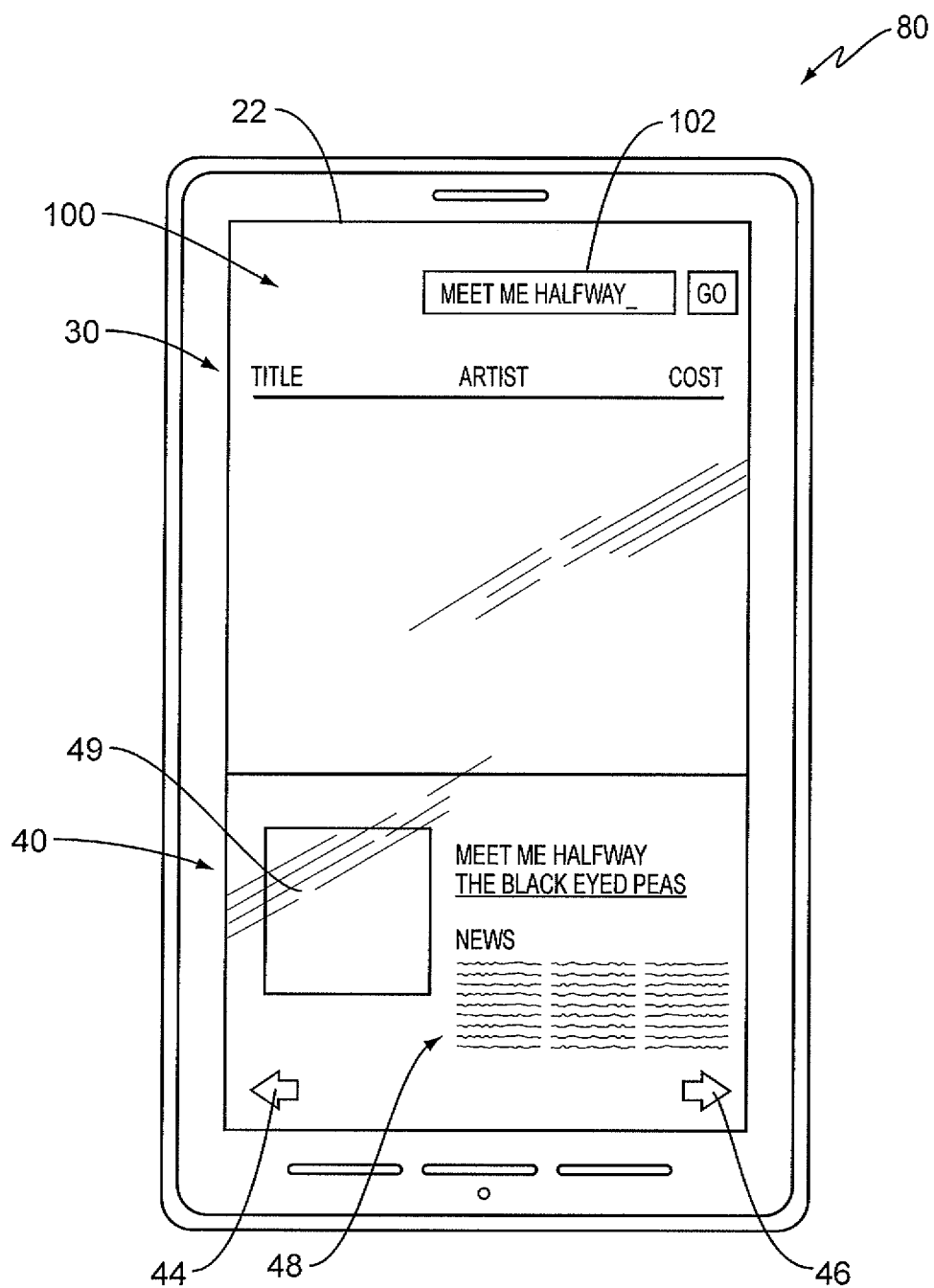
FIG. 8 is a perspective view of a tablet computing device configured to copy and paste text from another type of user document into a composition area according to one embodiment of the present invention.

In another embodiment, illustrated in FIG. 8, the text composition area 30 displays a web page 100 being visited by the user. The web page 100 may be associated with any desired website, but in this embodiment, the web page is associated with a site that sells music to consumers. Such websites include, but are not limited to, SPOTIFY and AMAZON, for example. The web page includes a search field 102 that receives user input identifying the title of a song, for example. Typically, the user could enter the name of a song to purchase into the search field 102 using the QWERTY keypad displayed in user input area 40. However, with the present invention, the user could touch navigation controls 44, 46 to scroll one or more user documents through the user input area 40. Once the user arrived at a desired user document, the user would perform a touch and release and/or a drag and release action as previously described on the desired text to automatically copy and paste the text into the search field 102.

Therefore, the present embodiments are to be considered in all respects as illustrative and not restrictive, and all changes coming within the meaning and equivalency range of the appended claims are intended to be embraced therein.

What is claimed is:

1. An electronic device comprising:
a touch sensitive display; and
a processor configured to execute a text editing application to:
display a user interface for the text editing application, the user interface including a user input area to receive user input and a text composition area to display text output;
display a user input interface in the input area, wherein the user input interface comprises a touch-sensitive keypad;
scroll through a plurality of user documents within the input area responsive to receiving one or more user commands, each user document being associated with another user application and comprising arbitrary text;
receive user input indicating selection of a user document from the plurality of user documents;
replace, responsive to a user command, the user input interface displayed in the input area with the selected user document that includes arbitrary text while continuing to display text output in the text composition area; and
copy and paste arbitrary text selected by the user from the selected user document displayed in the input area into the text composition area.

2. The electronic device of claim 1 wherein the processor is configured to scroll the plurality of user documents forwards and backwards through the input area responsive to respective first and second user commands.

3. The electronic device of claim 1 wherein the user document comprises a web page.

4. The electronic device of claim 1 wherein the processor is configured to automatically copy and paste the arbitrary text selected by the user from the selected user document displayed in the input area into the text composition area responsive to detecting a touch and release action performed by the user.

5. The electronic device of claim 4 wherein the processor is configured to automatically copy the arbitrary text selected by the user from the selected user document displayed in the input area into memory responsive to the user touching the arbitrary text.

6. The electronic device of claim 5 wherein the arbitrary text comprises a plurality of consecutive words contained in the selected user document that have been selected responsive to a drag action performed by the user.

7. The electronic device of claim 5 wherein the processor is configured to automatically paste the arbitrary text from the memory into the text composition area responsive to the user releasing the arbitrary text.

8. The electronic device of claim 1 wherein the processor is configured to partition the touch sensitive display into the input area and the text composition area.

9. A method of editing text on an electronic device having a touch display, the method comprising:
displaying a user interface for a text editing application executing on the electronic device to include a user input area to receive user input and a text composition area to display text output;
displaying a user input interface in the input area, wherein the user input interface comprises a touch-sensitive keypad;
scrolling through a plurality of user documents within the input area responsive to receiving one or more user commands, each user document being associated with another application and comprising arbitrary text;
receiving user input indicating selection of a user document from the plurality of user documents;
replacing the user input interface displayed in the input area with the selected user document that includes arbitrary text while continuing to display text output in the text composition area; and
copying and pasting arbitrary text selected by the user from the selected user document displayed in the input area into the text composition area.

10. The method of claim 9 wherein replacing the user input interface displayed in the input area with the selected user document comprises replacing the touch-sensitive keypad displayed in the input area with the selected user document responsive to receiving a user command.

11. The method of claim 9 wherein scrolling a plurality of user documents through the input area comprises scrolling the plurality of user documents forwards and backwards through the input area responsive to respective first and second user commands.

12. The method of claim 9 wherein copying and pasting the arbitrary text selected by the user from the selected user document into the text composition area comprises automatically copying and pasting the arbitrary text from the selected user document into the text composition area responsive to detecting a touch and release action performed by the user.

13. The method of claim 12 wherein automatically copying and pasting the arbitrary text comprises automatically copying the arbitrary text from the selected user document into memory responsive to the user touching the arbitrary text.

14. The method of claim 13 wherein automatically copying and pasting the arbitrary text comprises automatically copying a plurality of user-selected words from the selected user document respective to detecting a drag action performed by the user.

15. The method of claim 13 wherein automatically copying and pasting the arbitrary text comprises automatically pasting the arbitrary text from the memory into the text composition area responsive to the user releasing the arbitrary text.

16. The method of claim 9 further comprising partitioning the touch sensitive display into the input area and the messaging composition area.

\* \* \* \* \*